Figure 1:
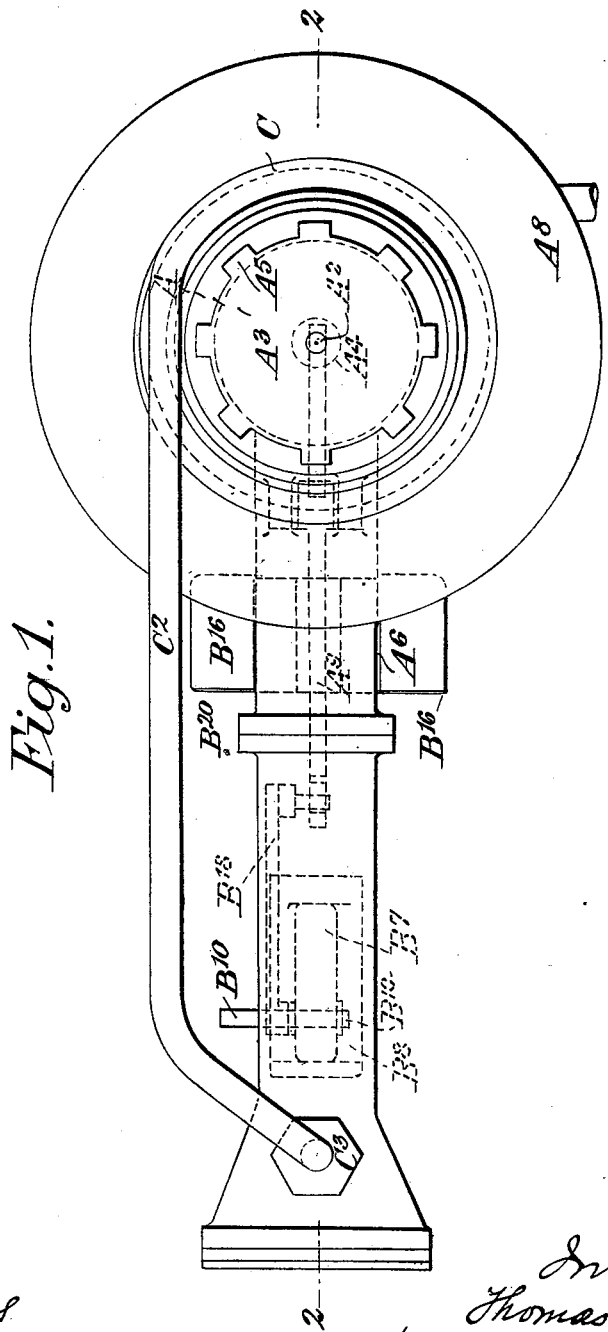

No. 630,658. Patented Aug. 8, 1899.
T. CLARKSON.
APPARATUS FOR BURNING GAS OR VAPOR.
(Application filed Mar. 29, 1899.)
(No Model.) 6 Sheets—Sheet 1.

Witnesses
Arthur A. Fisher.
Philip Farnsworth.

Inventor
Thomas Clarkson
by Foster Freeman
Attorneys

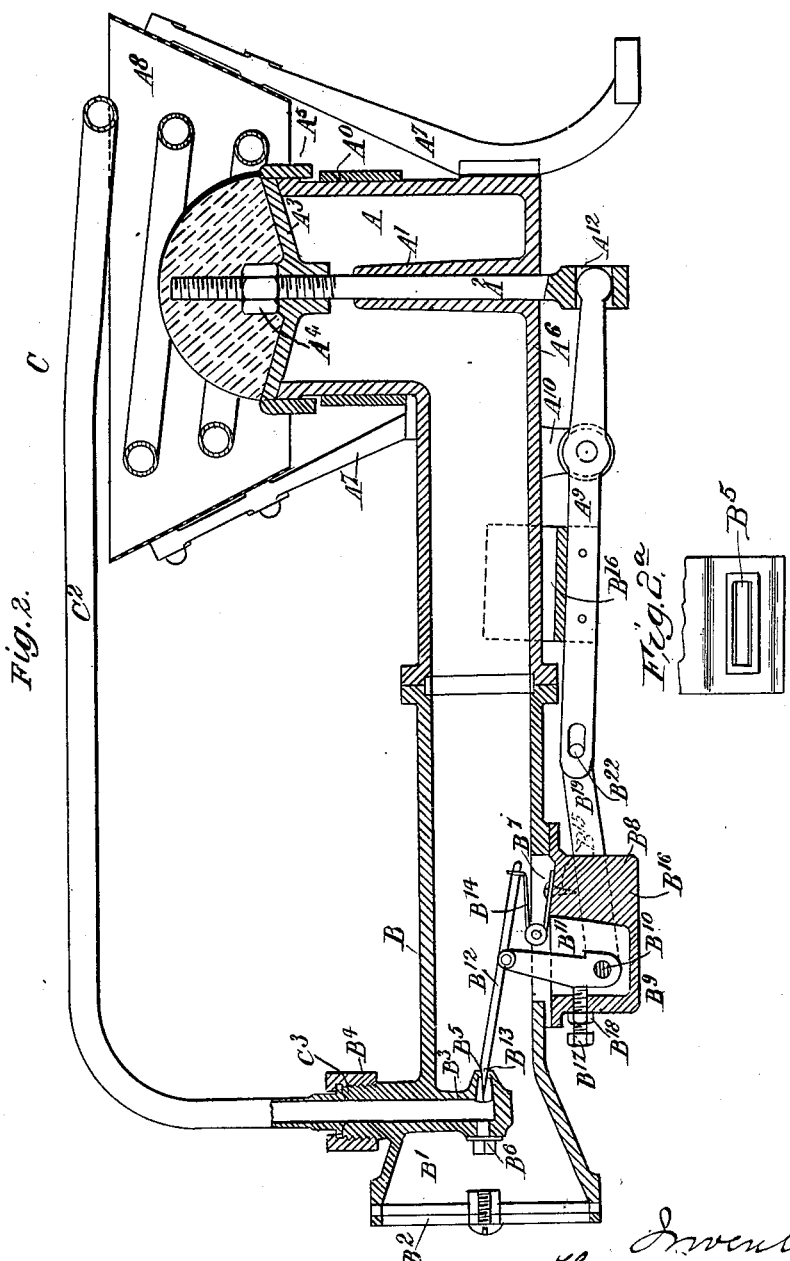

No. 630,658. Patented Aug. 8. 1899.
T. CLARKSON.
APPARATUS FOR BURNING GAS OR VAPOR.
(Application filed Mar. 29, 1899.)
(No Model.) 6 Sheets—Sheet 3.

Witnesses
Arthur A. Fisher
Philip Farnsworth

Inventor
Thomas Clarkson
by Foreen Freeman
Attorneys

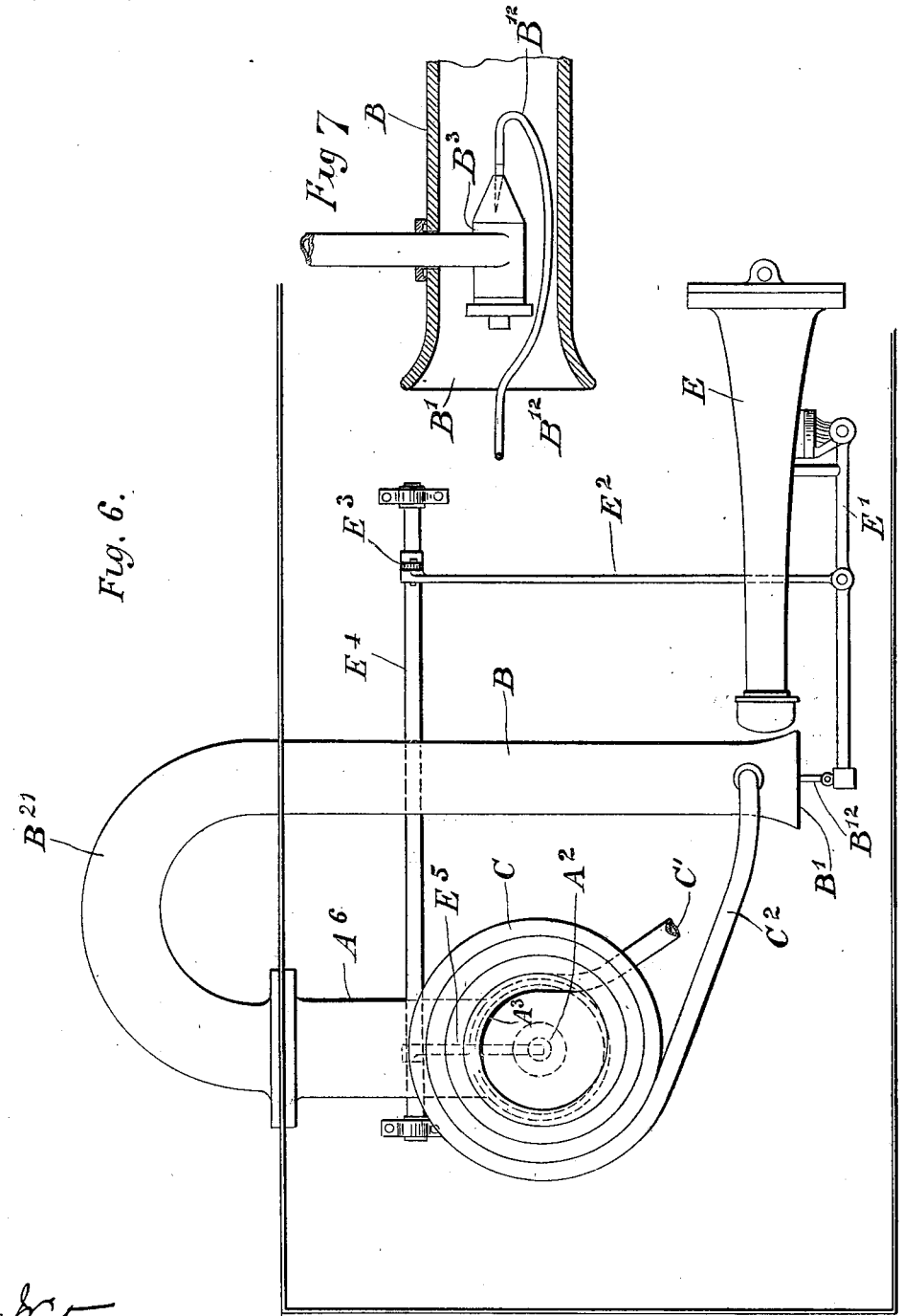

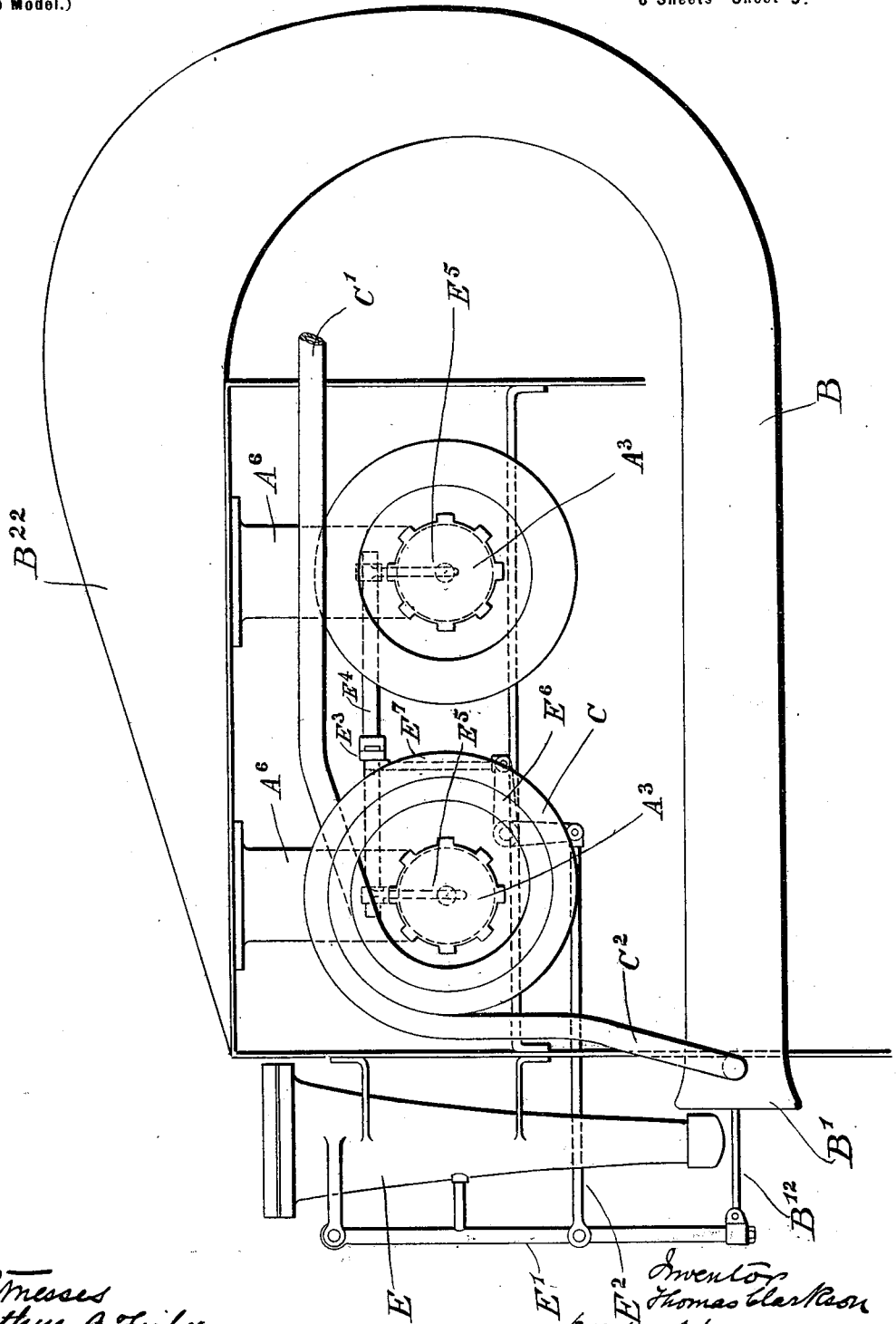

No. 630,658. Patented Aug. 8, 1899.
T. CLARKSON.
APPARATUS FOR BURNING GAS OR VAPOR.
(Application filed Mar. 29, 1899.)

(No Model.) 6 Sheets—Sheet 6.

Witnesses
Arthur A. Fisher
Philip Farnsworth

Inventor
Thomas Clarkson
by
attorneys.

UNITED STATES PATENT OFFICE.

THOMAS CLARKSON, OF LONDON, ENGLAND, ASSIGNOR OF ONE-HALF TO THE CLARKSON & CAPEL STEAM CAR SYNDICATE, LIMITED, OF COUNTY OF SURREY, ENGLAND.

APPARATUS FOR BURNING GAS OR VAPOR.

SPECIFICATION forming part of Letters Patent No. 630,658, dated August 8, 1899.

Application filed March 29, 1899. Serial No. 710,993. (No model.)

*To all whom it may concern:*

Be it known that I, THOMAS CLARKSON, a subject of the Queen of England, residing at London, England, have invented certain new and useful Apparatus for Burning Gas or Vapor, (for which I have made application for Letters Patent in Great Britain under No. 18,679, dated August 31, 1898,) of which the following is a specification.

This invention relates to the burning of inflammable gas or vapor and to apparatus therefor, and although otherwise applicable is particularly suitable for burners in which a wide range of adjustment is required, and I will describe it as applied to a burner suitable for burning oil-vapor for heating purposes. A common form of such a burner comprises the burner proper, which may be of varied construction, and a vaporizer in which the oil is subjected to the action of heat and the vapor led to the burner, where or before it reaches the burner it is mixed with air. Preferably the vapor is discharged into an inducing-tube, where it acts on the principle of an injector sucking in the air into a closed box, which forms the under portion of the burner, the top being composed of openings of some description, through which the inflammable vapor mixture passes to be burned. Means are generally provided to vary the amount of vapor allowed to escape into the inducing-tube according to the volume of flame required. It has been found that with this arrangement the pressure in the burner-box, and consequently the velocity of the vapor mixture passing through the burner-openings, varies, so that when the pressure and velocity are low "striking back" or the ignition of the inflammable mixture inside the burner-box is liable to take place.

To get over the above drawback, I now provide means whereby the pressure in the burner-box may be maintained substantially constant, although slight variations may not be material. This I prefer to effect by varying the size or number of the orifice or orifices through which the vapor mixture escapes to be burned. Many different ways of effecting this object will readily present themselves. Two of these are to shut off a certain number of the orifices, so that a smaller number only remain, or to reduce the size of some or all of the orifices. Should the top of the burner be formed as a grid with a number of long narrow apertures, a slide—internal or external and operating like a "hit-and-miss" ventilator—would be suitable for the purpose, or a plain slide without openings to shut off certain of the orifices would be suitable. Where the orifice was circular, a conical plug could be used. In another arrangement the burner might have an open top or end closed by a solid lid, so as to leave a space around the edges, which could be varied by moving the cover nearer to or farther from the open end. Many other devices for effecting the same arrangement may be employed. Whatever arrangement is employed, it should be directly or indirectly connected with some controlling portion of the apparatus—say, for example, with that which controls the admission of the vapor from the vaporizer to the inducing-tube, should the latter be employed.

By the above invention it will be seen that the exit from the burner or burner-box of whatever description may be varied either independently of but in proportion to the vapor-jet, and thereby the pressure or velocity of the mixture of air and vapor may be kept substantially constant.

In some forms of burner, particularly circular ones, the exterior of the issuing-orifice has a larger sectional area than the interior thereof, which may result in a "slack" flame. To overcome this, one or both of the faces of the outlet-conduit may be inclined or otherwise arranged, so as to correct this variation of sectional area.

It sometimes happens that owing to the great heat from the flame or the body which it heats the upper portion of the burner or burner-box becomes so highly heated that the vapor mixture inside will light by mere contact with the heated walls of the burner. To prevent this, I may employ a slab or other arrangement of refractory material for protective purposes.

Figure 4:
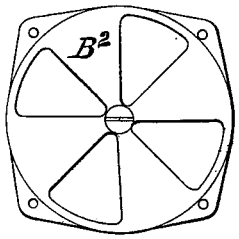
Figure 3:
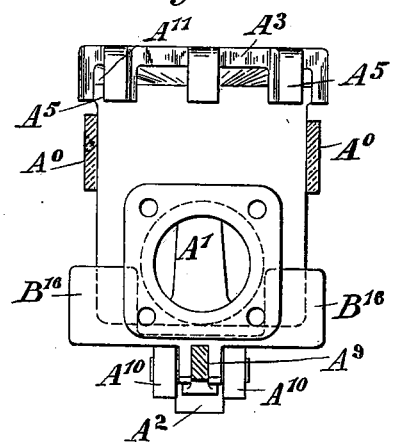
Figure 5:
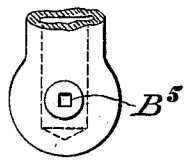
Figure 10:
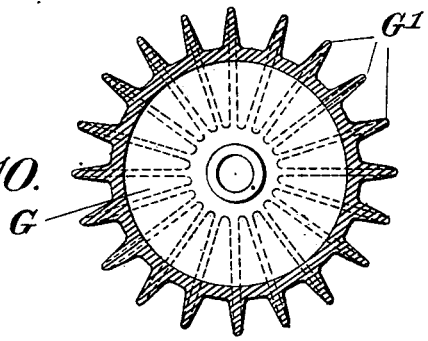
Figure 9:
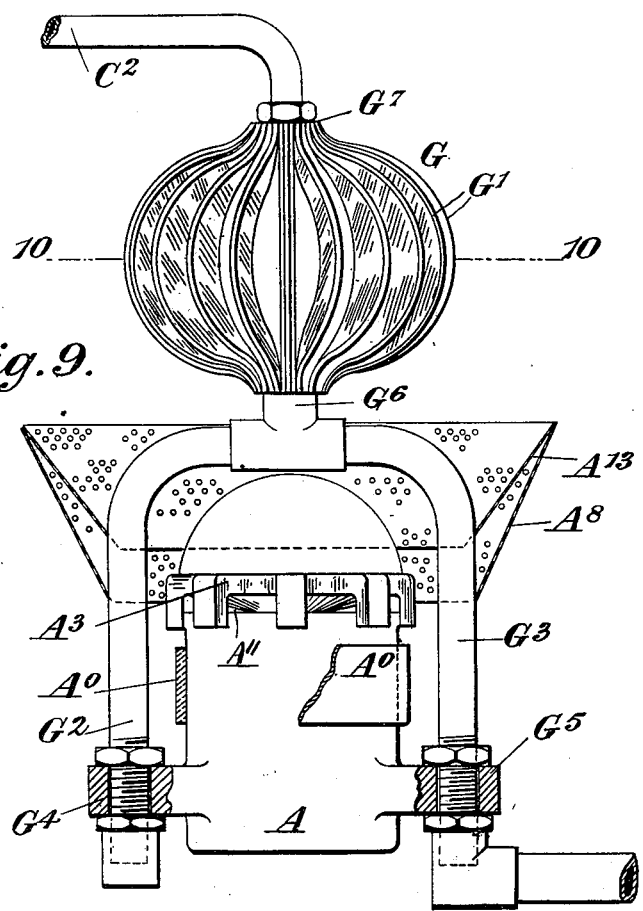

In the accompanying drawings, Figure 1 is a plan of a form of burner constructed according to this invention. Fig. 2 is a section on the line 2 2 of Fig. 1. Fig. 2$^a$ is an end view of the gas-delivering nozzle on an enlarged scale. Fig. 3 is a detached view of the burner-box. Fig. 4 is a view of the induction-tube air-regulator. Fig. 5 is an enlarged end view of the vapor-delivery nozzle. Fig. 6 is a plan showing an alternative form of burner. Fig. 7 is a detail, enlarged, of Fig. 6. Fig. 8 is a plan of a burner with two burner-boxes. Fig. 9 is a view of an alternative form of generator, and Fig. 10 is a section on the line 10 10 of Fig. 9.

Like letters indicate like parts in all the figures.

With reference more particularly to Figs. 1, 2, 3, and 4, the burner-box comprises a cylindrical body A, having a casing $A^0$, of refractory material, and an internal central boss $A'$, bored to form a bearing for a rod $A^2$, and having a cover $A^3$, covered with a threaded central boss, into which is screwed one end of the rod $A^2$, onto which it is locked in any desired position by a nut $A^4$. The cover fits on the top of the body A, so as to completely close it or form when raised an annular ring of openings $A^{11}$ for the exit of the vapor mixture. It may be provided with fingers $A^5$, engaging the outer surface of the body A, so as to split up the issuing gases. Preferably the cover is formed, as shown in Fig. 2, sloping toward the center boss, and in this case the walls of the body A will be formed with a corresponding top bevel.

A horizontal tube $A^6$ is formed on the side of the body A at its lower part, connected by flanges or otherwise with and forming part of the induction-tube B.

Brackets $A^7$ are secured on the burner-box A to carry a funnel $A^8$, preferably perforated, surrounding the upper part of the burner-box and extending upward, which acts as a directing-plate and igniter, a radiator to the flame, and a promoter of combustion. If desired, two funnels may be used, as shown in Fig. 9, hereinafter described.

The free end $B'$ of the induction-tube B for the admission of air is preferably bell-shaped or conical and desirably provided with a regulating device, which may be of any ordinary type, a convenient form $B^2$ being shown in Figs. 2 and 4. The vapor is delivered through a nozzle $B^3$, placed centrally within the tube at the commencement of its normal diameter. Desirably it is formed, as shown, integral with the induction-tube and is provided with an externally-threaded end for connection with the vapor-delivery pipe of the generator. The vapor-delivery orifice $B^5$ is preferably square or rectangular. A screw-plug $B^6$ may be provided for constructive and cleaning purposes. In the lower part of the tube is an oblong opening $B^7$, over which is secured a cap $B^8$, having a recess $B^9$, through which runs a rocking shaft $B^{10}$.

Rigidly secured on the rocking shaft and extending up into the induction-tube is an arm $B^{11}$, the upper end of which is pivotally secured to a bar $B^{12}$, with a chisel-shaped end $B^{13}$, which forms the regulator of the vapor-nozzle orifice $B^5$. The beveled face of the chisel is on the upper side, and to hold the flat face against the bottom surface of the orifice tension in an upward direction is applied to the under side of the other end of the bar by means of a spring $B^{14}$, secured to the cap $B^8$ by a screw $B^{15}$. Instead of a flat chisel-ended bar $B^{12}$ entering a rectangular orifice $B^5$ a conical bar or needle entering a circular opening may be used; but this would necessitate the use of special compensating mechanism to maintain the equality of ratio between the areas of the opening $B^5$ and that of the openings $A^{11}$.

A screw-pin $B^{17}$, with a lock-nut $B^{18}$, may be used to limit the extreme inward throw of the bar $B^{12}$. One end of an arm $B^{19}$ is secured on the rocking shaft $B^{10}$ outside the cap, its other end being provided with a pin $B^{22}$.

A lever $A^9$, fulcrumed in lugs $A^{10}$ on the lower side of $A^6$, is at one end slotted and engaged by the pin $B^{22}$, its other end engaging in a slot $A^{12}$, formed in the lower end of the rod $A^2$, previously referred to. $B^{16}$ is a counterweight to aid in balancing the lever $A^9$ and the parts supported thereby.

The generator C is formed as a coil placed within the funnel $A^8$, so that the lowest ring of the coil is just above the escape-orifice $A^{11}$ for the vapor mixture. It communicates with any convenient oil-supply by a pipe $C'$, while the top coil is connected by a pipe $C^2$ and screw-coupling $C^3$ with the end $B^4$ of the delivery-nozzle. Preferably each ring of the coil is larger than the one immediately beneath it, so that the coil has the form of an inverted cone. By this arrangement of the generator-coil the flames issuing from the orifices $A^{11}$ pass up between the coil C and the funnel $A^8$ without directly impinging on the coils.

An alternative construction of generator is shown in Figs. 9 and 10, in which the generator is formed with hollow body G, preferably shaped as a flattened sphere, as shown in Fig. 9, and provided with vertical ribs or other projections $G'$ to promote conduction and extend the heating-surfaces. The body G is held centrally over the burner-box A by a tubular support comprising a T $G^6$, connected to the bottom of the body G and communicating with the interior thereof, and two bent vertical tubes $G^2$ $G^3$, carried in lugs $G^4$ $G^5$, formed with or fixed on the burner-box A. The end of one tube—say $G^2$—is closed by a cap or plug, the other, $G^3$, being connected in any convenient manner with the oil-supply pipe. If desired, the pipe $G^2$ or part of it might be a solid rod.

The vapor-delivery pipe is connected with the upper part of the body G—say at $G^7$. The tubes $G^2$ $G^3$ may also act as brackets to carry the funnel, which may be, as previously described, a single plate $A^8$ or may be constructed with a second inner wall $A^{13}$, forming a space into which the flames issuing from the burner-box shoot. The walls $A^8 A^{13}$ are perforated.

By using the two plates $A^8 A^{13}$, with a space between them into which the flames from the burner shoot, a greater radiating-surface is provided, the generator will be protected from direct action of the flame, and will not, consequently, be burned out so rapidly. The generator will also not be so intensely heated as it would if subjected to the direct action of the flame, and this will be advantageous, especially when burning very volatile oils.

The top of the cover $A^3$ may be coated with a mass of fire-clay or other refractory non-conducting material to avoid overheating of the cover and prevent ignition of the vapor mixture within the burner-box.

As shown in Fig. 2, the delivery-nozzle orifice $B^5$ is completely closed by the regulating-bar $B^{12}$, and the burner-box A is also entirely closed by its cover $A^3$. By rocking the shaft $B^{10}$ to give movement of the arm $B^{11}$ to the right the orifice $B^5$ can be opened to any desired degree. At the same time by the action of the arm $B^{19}$ on the lever $A^9$ the rod $A^2$ raises the cover $A^3$, forming the escape-orifices $A^{11}$ for the vapor mixture to a size varying in constant proportion to the size of the orifice $B^5$ of the delivery-nozzle.

The rocking shaft $B^{10}$ may be turned by hand or connected with and operated by any desired controlling mechanism. It is evident that, if desired, the controlling mechanism may be connected to either the arm $B^{19}$ or the lever $A^9$ instead of to the rocking shaft.

In Fig. 6 is shown an alternative arrangement of the induction-tube and the connections for operating the regulating mechanism. The induction-tube B is connected to the burner-box A by a curved portion $B^{21}$. The nozzle-delivery-regulating bar $B^{12}$ is bent so as to be carried below the nozzle and brought out through the bell-mouthed opening $B'$ of the induction-tube and connected with one end of a rod $E'$, the other end of which is pivoted onto a temperature or pressure regulator E—such, for example, as is described in an earlier British patent, No. 20,166, dated September 11, 1896. The rod $E'$ is likewise connected by a link $E^2$ with an arm $E^3$ on a rocking shaft $E^4$. On this shaft $E^4$ is an arm $E^5$, with a rod corresponding in function with the short arm of the lever $A^9$ of Fig. 2 and engaging, like that arm, with a rod carrying the burner-box lid $A^3$.

Two or more burner-boxes may be supplied by one induction-tube and vapor-generator. Such an arrangement is shown in Fig. 8, in which two burner-boxes are shown connected by their tubes $A^6$ to an expanded portion $B^{22}$ of the common induction-tube B. The arrangement is similar to that shown in Fig. 6, except that the position of the regulator E is altered, so that its rod $E'$ is at right angles to the rocking shaft $E^4$ instead of being parallel to the same, necessitating the use of a bell-crank lever $E^6$ and link $E^7$ between the said rocking shaft and the link $E^2$. An arm $E^5$ is provided for each burner-box rod $A^2$.

I claim—

1. In an apparatus for burning an inflammable mixture, the combination with a burner having a discharge-orifice, a mixing-chamber communicating with the burner, and a nozzle to deliver fuel to the mixing-chamber, of means for regulating the supply of fuel to the mixing-chamber and simultaneously adjusting the burner-orifice, whereby the supply of fuel to the mixing-chamber is regulated to the capacity of consumption at the burner, and a substantially constant pressure maintained in the mixing-chamber for the purpose set forth.

2. In an apparatus for burning an inflammable mixture, the combination of a burner having a discharge-orifice, a device to adjust the size of said orifice, a mixing-chamber communicating with the burner, a nozzle to deliver fuel to the mixing-chamber, a device to adjust the size of the discharge-orifice of the nozzle, and means to move the adjusting devices of said discharge-orifices simultaneously, substantially as and for the purpose set forth.

3. In an apparatus for burning an inflammable mixture, the combination of a burner having a discharge-orifice, a movable plate to adjust the size of the orifice, a mixing-chamber communicating with the burner, a nozzle to deliver fuel to the mixing-chamber, a movable bar having a tapered end projecting into the discharge-orifice of the nozzle, and movable connections between the said bar and plate to operate them simultaneously, substantially as and for the purpose set forth.

4. In an apparatus for burning an inflammable mixture, the combination of a burner having a discharge-orifice, a movable device to adjust said discharge-orifice, a mixing-chamber communicating with the burner, a nozzle to deliver fuel to the mixing-chamber, said nozzle having a cross-sectionally-angular discharge-orifice, a bar having a chisel-shaped end projecting into the nozzle-orifice, and movable connections between the bar and the adjusting device of the burner-orifice to operate them simultaneously, substantially as and for the purpose set forth.

5. In an apparatus for burning an inflammable mixture, the combination of a burner having a discharge-orifice, a movable device to adjust said discharge-orifice, a mixing-chamber communicating with the burner, a nozzle to discharge fuel into the mixing-chamber, said nozzle having a cross-sectionally-angular discharge-orifice, a bar having a chisel-shaped end projecting into the orifice, a spring to hold the flat face of the bar against the opposing edge of the orifice, and movable connections between the adjusting device of the burner-orifice and the bar to operate them simultaneously, substantially as and for the purpose set forth.

6. The combination with a fuel-discharge nozzle having a cross-sectionally-angular discharge-orifice, of a rocking support, a bar pivoted intermediate its ends on said support and having a chisel-shaped end projecting into the discharge-orifice of said nozzle, and means to rock the support, substantially as described.

7. The combination with a fuel-discharge nozzle having a cross-sectionally-angular discharge-orifice, of a bar pivotally supported intermediate its ends and having a chisel-shaped end projecting into the orifice, a spring to hold the flat face of the bar against the opposing edge of the orifice, and means to reciprocate the bar, substantially as described.

8. In an apparatus for burning an inflammable mixture, the combination with a burner, a casing surrounding the burner and formed of two funnels connected at their upper edges and spaced apart at their lower edges, the said funnels being perforated and supported to permit the flame from the burner to pass into the space between them, and a generator supported within the vertical plane of the casing and adjacent to the latter to be heated by the flame from the burner, substantially as set forth.

9. In an apparatus for burning an inflammable mixture, the combination of a burner having a discharge-orifice, a device to adjust the size of said orifice, a mixing-chamber communicating with the burner, a nozzle to deliver fuel to the mixing-chamber, a device to adjust the size of the discharge-orifice of the nozzle, movable connections between the said adjusting devices, and an automatically-operating device to move the said connections to operate the adjusting devices simultaneously, substantially as and for the purpose specified.

In testimony whereof I have hereunto set my hand in the presence of the two subscribing witnesses.

THOMAS CLARKSON.

Witnesses:
W. M. HARRIS,
T. J. OSMAN.